Sept. 18, 1923.

W. G. WERBECK

PIPE UNION

Filed Jan. 2, 1920

1,468,187

Patented Sept. 18, 1923.

1,468,187

UNITED STATES PATENT OFFICE.

WALTER G. WERBECK, OF CHICAGO, ILLINOIS; CARL W. HAGEMANN, ADMINISTRATOR OF SAID WALTER G. WERBECK, DECEASED.

PIPE UNION.

Application filed January 2, 1920. Serial No. 348,916.

*To all whom it may concern:*

Be it known that I, WALTER G. WERBECK, a citizen of the United States, residing at Chicago, in the county of Cook and State of Illinois, have invented certain new and useful Improvements in Pipe Unions, of which the following is a specification.

This invention relates to improvements in pipe unions or flange joints. One object is to provide a device of this type that is absolutely leak-proof, that is of great strength, that is very simple in construction and arrangement of parts and that is readily applied to or removed from the work. A further object is to provide a pipe union that is so constructed as to provide for wear of its parts, an adjustment of the component parts of the coupling being possible to compensate for wear. The coupling, further, is so constructed that when joint compounds are used the surplus compound will be admitted between the separable members of the union and so effect a closer and more perfect connection of its parts.

With the foregoing and other objects in view the invention consists in the combination and arrangement of parts to be hereinafter fully described, pointed out in the appended claim and illustrated in the accompanying drawing which forms a part of this specification and in which—

Like reference characters denote corresponding parts in both views.

Figure 1:
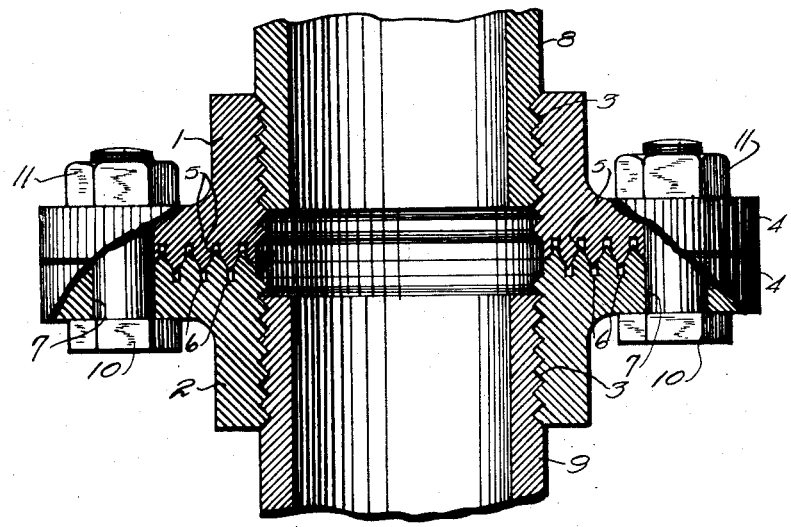
Fig. 1 is a longitudinal sectional view through my improved union illustrating its application.
Figure 2:
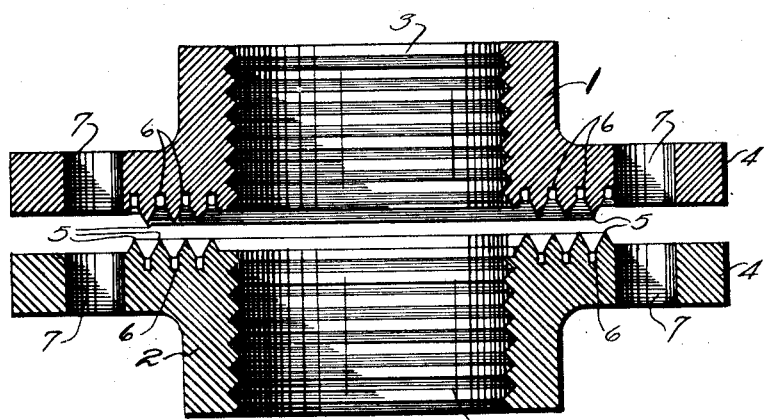
Fig. 2 is a sectional view of the union sections.

My pipe union comprises a pair of collars 1, 2 of counterpart formation, each collar being formed interiorly with the screw threads 3 and with an annular terminal flange 4 and each flange and one end of each collar being formed with the concentric ridges 5 which have sharply inclined side faces and are concentric also with the threaded bore in the collar. The several ridges 5 of each collar are separated from each other by the corresponding substantially rectangular grooves 6 and the ridges of the one collar are adapted to fit into the grooves of the other collar and vice versa, the grooves being appreciably deeper than the ridges. The flange of each collar is provided, further, with bolt openings 7 which, when the collars are in position upon the pipe sections 8, 9, are aligned with each other and are adapted to receive the bolts 10 which are adjusted by nuts 11 to secure the collars, which have been screwed upon the threaded ends of the pipe sections, in closest engagement with each other. Wear of the meeting ends of the collars is taken up by further adjustment of the bolts 10 to cause deeper engagement of the ridges 5 of the one collar with the grooves 6 of the other.

When joint compounds are used such compounds will work between the meeting ends of the unions and serve to seal them more effectually and so to render the coupling more efficient.

What is claimed is:—

In a pipe union, a pair of collars of counterpart formation, said collars being internally threaded and provided with annular flanges, spaced annular ridges having sharply inclined side faces formed in each of said collars, said ridges being spaced by appreciably deep rectangular grooves therebetween and below the inclined portions of the side faces of said ridges, said ridges being disposed in concentric relation with the ridges of one collar adapted to engage between the ridges of the other, and means for securing said flanges together to assemble the union.

In testimony that I claim the foregoing as my own I have hereto affixed my signature in the presence of two subscribing witnesses.

WALTER G. WERBECK.

Witnesses:
EDWARD A. ENGELBERT,
H. J. SANDERS.